Nov. 23, 1971 R. MAYER ET AL 3,621,721

TUNERS AND, MORE PARTICULARLY, TUNERS FOR TELEVISION SETS

Filed Oct. 8, 1969 2 Sheets-Sheet 1

INVENTORS

RUDOLF MAYER and LOTHAR VOLKHEIMER

BY

Craig, Antonelli, Stewart & Hill

Attorneys

INVENTORS
RUDOLF MAYER and LOTHAR VOLKHEIMER
BY
Craig, Antonelli, Stewart & Hill
Attorneys 3,621,721
TUNERS AND, MORE PARTICULARLY, TUNERS FOR TELEVISION SETS

Rudolf Mayer, Charlottenwalde, and Lothar Volkheimer, Trossingen, Germany, assignors to Messrs. R. & E. Hopt KG Filed Oct. 8, 1969, Ser. No. 864,665
Claims priority, application France, Sept. 12, 1969, 6931076
Int. Cl. F16h 35/18
U.S. Cl. 74—10.6 17 Claims

ABSTRACT OF THE DISCLOSURE

A tuner for a television set includes a drive arrangement comprising a drum rotatably supported about its longitudinal center axis, and provided with a plurality of set screws which are evenly spaced in an angular direction about said axis. The screws extend in parallel relationship with the longitudinal center line of the drum and are engageably coupled with a scanning member which is provided with a V-shaped cam piece located in the path of the set screws. The peak of the V-shaped cam piece contacts the end of the set screw which is operated when a tuning knob connected with the tuner is moved whereby a tuning element which is coupled to the scanning member is controlled.

The present invention relates to a tuner, and more particularly, a tuner for television sets, with drive means comprising a drum rotatably supported about its longitudinal center line and provided with set screws evenly spaced along the circumference of the drum and extending a parallel relationship with the longitudinal center line of the drum and a scanning member coupled with tuning elements of the tuner and provided with a V-shaped cam piece located in the path of said set screws, the peak of said V-shaped cam piece contacting the end of that set screw which is in the operative position.

In known arrangements of this type, the drive is installed in a separate housing, which is then assembled with a housing containing the tuning elements of the tuner. Such arrangements require a great deal of space and assembling the individual assemblies calls for careful work by qualified skilled labour. Consequently, such arrangements have not been reduced to practice heretofore. Instead, the drums are provided with radially movable positioning elements and the scanning member takes the form of a pivoted lever moving in an essentially radial direction with respect to the drum and mounting, at its free end, a toothed segment which is concentric with the axis of rotation of the lever. This toothed segment engages a driving pinion for the tuning elements accommodated in a separate housing, e.g. variable capacitors of the tuner. However, the space requirement is still considerable and the difficulties of assembly remain the same.

It is an object of the present invention to avoid these disadvantages of the known arrangements. According to the invention, this objective is accomplished by an arrangement in which the drum is mounted on an axle or shaft secured in the housing of the tuner and in which the scanning member is formed by a slide supported in the housing of the tuner, tuning elements of the tuner being directly engaged by said slide.

In this manner, a very compact, space-saving tuner with a directly built-in drive is obtained. The tuner according to the present invention, including the drive, consists of a single, handy, and space-saving unit. When installing the tuner according to the invention in a television set, for example, only very few and simple fasteners are required and the difficulties of assembly regarding an accurate coordination between the locations of two assemblies with respect to each other are avoided. Furthermore, the slide forming the scanning member may be guided in cut-outs of the tuner housing, which are easy to make, while the axle or shaft for the drum is supported in ordinary holes in the tuner housing. The tuner according to the present invention thus affords the additional advantages of reduced material requirements and less expenive assembly.

To obtain a simple and direct transformation of the longitudinal motion of the slide-type scanning member into the rotary motion of a tuning shaft, e.g. of tuning elements in the form of variable capacitors, a further embodiment of the invention provides for a slide with a lateral projection on a portion located within the housing on which rests an arm which is mounted on a tuning shaft extending transversely to the slide, said arm being loaded by a spring which forces the arm against said projection and the slide, together with its cam piece, against the set screw which is in the operative position. The advantage of such a transmission of motion resides in the fact that it obviates the need for a gear arrangement which would increase the cost of the tuner according to the invention. Accordingly, this arrangement may be manufactured at extremely low cost and, simultaneously, eliminates troublesome play in the drive system.

In one embodiment of the invention, the drum is fastened on a shaft and a control knob, which is rotatably supported on this shaft, may be alternately coupled with the drum or the set screw which is in the operative position. In this manner, channel selection and fine tuning of the selected channel may be effected with a single control knob. A particularly simple method of alternately coupling the control knob with the drum or the set screw is achieved by an arrangement in which the control knob is supported in a manner permitting it to be slidably displaced in the longitudinal direction of the shaft and in which said knob, in the one position, forms a positive connection with the drum and, in the other position, a positive connection with a transmission connected to the set screw which is in the operative position.

To obtain a simple positive connection between the control knob and the drum, the control knob may be hollow and surround the drum on at least a portion of its length. In this case, the drum is provided with teeth along its circumference which, in the one position, are engaged by a projection of the control knob. The advantage of this arrangement resides in the fact that it results in a particularly compact construction because the various components partially overlap each other in the axial direction and because some of the components may be accommodated in the interior of the hollow control knob. In addition, the knob will have a comparatively large diameter, which is particularly advantageous for manipulation, without any space being wasted to achieve this effect.

In one embodiment of the tuner according to the invention, the positive connection between the control knob and the set screws is established in a simple manner by an arrangement in which the control knob is provided with a toothed wheel rim which is concentric with the shaft and which, in the other position, engages a gear disposed on the set screw which is in the operative position. An advantageous arrangement is one in which the toothed wheel rim is disposed on the circumference of that end of a bushing of the control knob which projects into the drum.

To prevent any accidental shifting of the fine-tuned setting, the control knob may be loaded by a helical compression spring which is concentric with the shaft and which tends to keep the control knob in the one position in which it forms a positive connection with the drum.

In one embodiment of the invention one gear is slidably, but not rotatably, supported on each of the set screws and loaded by a spring which tends to keep the gear in a position outside the area in which it may be engaged by the toothed wheel rim connected to the control knob. Furthermore, a stop is disposed in the area of the operative position of the set screws, said stop being engaged by the end face of the gear on the set screw which is in the operative position and forcing the gear into the area in which it may be engaged by the toothed wheel rim. This is a simple and advantageous method of ensuring that only that set screw may be rotated by means of the depressed control knob which is associated with the selected channel, i.e. that set screw which is in the operative position. The stop may be disposed on a sleeve which is rotatably supported on the shaft, non-rotatably guided in the housing, and projecting into that end face of the drum which faces the housing, such that a simple coaxial arrangement is achieved which does not require any additional guiding parts.

According to a further modification of the invention, the sleeve carrying the stop may be supported in a manner permitting it to be slidably displaced on the shaft and may be forced into the direction of the drum by a spring. In this case, axially directed control cams cooperating with lugs on the sleeve are provided on the end face of the drum. When the drum is rotated, these axially directed control cams will axially displace the sleeve within the range between the respective operative positions until the stop is moved out of reach of the gears. This is a simple method of ensuring that, essentially, only axial and no peripheral forces will be exerted on the gears, which are connected to the set screws in a manner preventing separate rotation, by the sleeve being displaced in an axially parallel direction, thus eliminating any risk of accidentally detuning the selected channel by forces acting on the gears in a peripheral direction when the drum is rotated. To ensure smooth gliding of the lugs of the sleeve on the control cams, the development of the axially directed control cams over the length of one arc each, equalling the distance between adjacent set screws, may show a V-shaped pattern with an outwardly directed peak. This will also enable the control knob to be rotated in either direction in order to select a specific channel.

To provide a simple and inexpensive indicating device, the scale pointer of one embodiment of the invention, which features a scale, is provided on an arm extending in essentially parallel relationship to the slide and being swivably disposed about an axis directed perpendicularly to the slide. In the area between the axis and the end carrying the pointer, this arm is connected to the slide through a slotted-link-type guide with a slotted link disposed diagonally to the direction in which the slide moves, such that the arm may be driven by the slide. A particularly simple arrangement is one, in which the slotted link is disposed on a lateral surface of the slide and engaged by a pin which laterally projects from the arm. Thus, the tuner according to the invention does not include any parts which would additionally increase its size. Furthermore, this arrangement provides a direct indication in accordance with the position of the slide. To obviate the need for a special joint, such as a ball-and-socket joint, a further modification of the invention provides for the arm, which is preferably made of plastic, to be permanently fastened to the housing and to be provided with a point of reduced strength serving as a joint in the area of the axis.

To obtain accurately defined tuning locks for channel selection which insure that the peak of the slide will always be in contact with a set screw so that the tuning elements will be located in an accurately defined position, the shaft carrying the drum, according to a preferred embodiment of the invention, is provided with axially directed locking grooves distributed along the circumference of the shaft at a point located within the housing, each of said locking grooves corresponding to a specific operative position of the drum and being engaged by a spring-loaded locking member disposed on the housing.

According to this embodiment of the invention, the shaft may be located near a wall of the housing and the locking member may be formed by a ball supported in an opening in the wall of the housing and loaded by a leaf spring on the side of the wall of the housing facing away from the shaft. This tuning lock arrangement may be manufactured in a simple and inexpensive manner and takes up extremely little space both inside and outside the tuner housing.

Further details and modifications of the invention will become apparent from the following description, in which the invention will be described and explained in greater detail with reference to the embodiment shown by way of example in the accompanying drawing. In other embodiments of the invention, the features apparent from the specification and the drawing may be applied either individually by themselves or in any desired combination of a plurality of such features. In the accompanying drawing FIG. 1 is a top plan view of a tuner according to the invention with the top of the housing removed, FIG. 2 is a section taken along the line II—II in FIG. 1.

Figure 1:
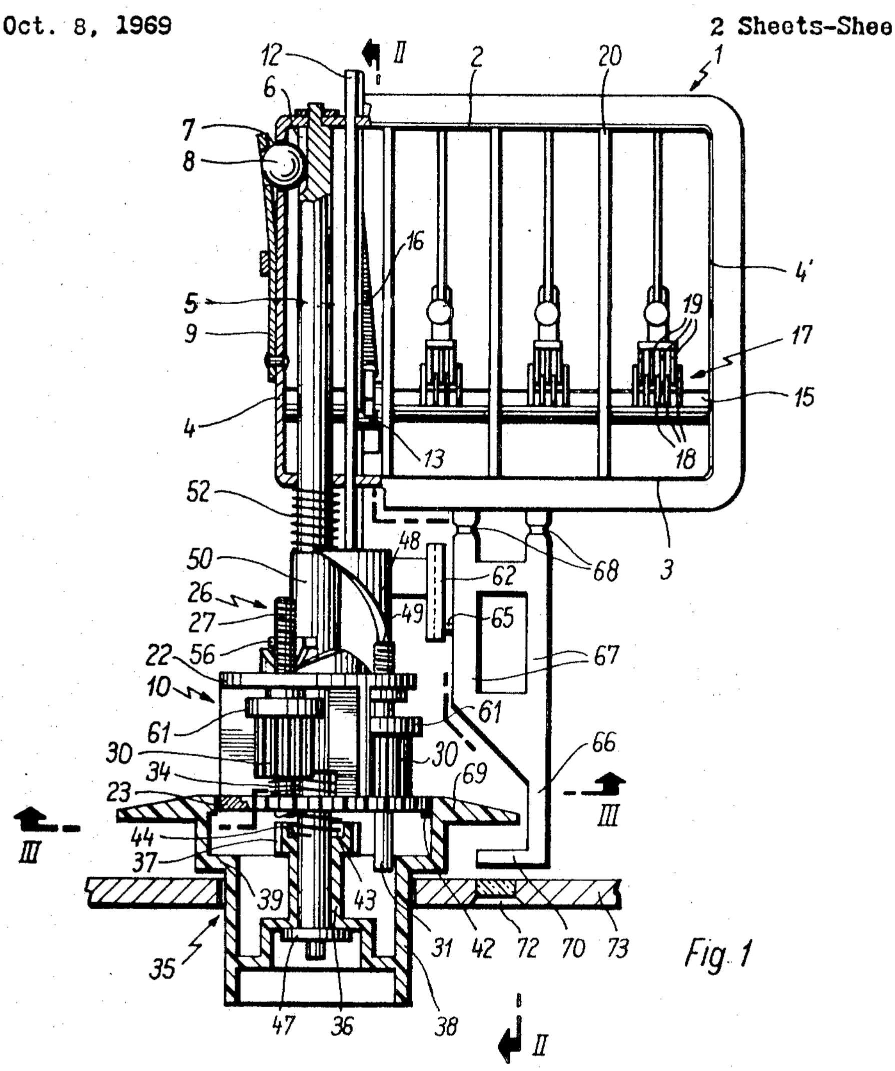
Figure 2:
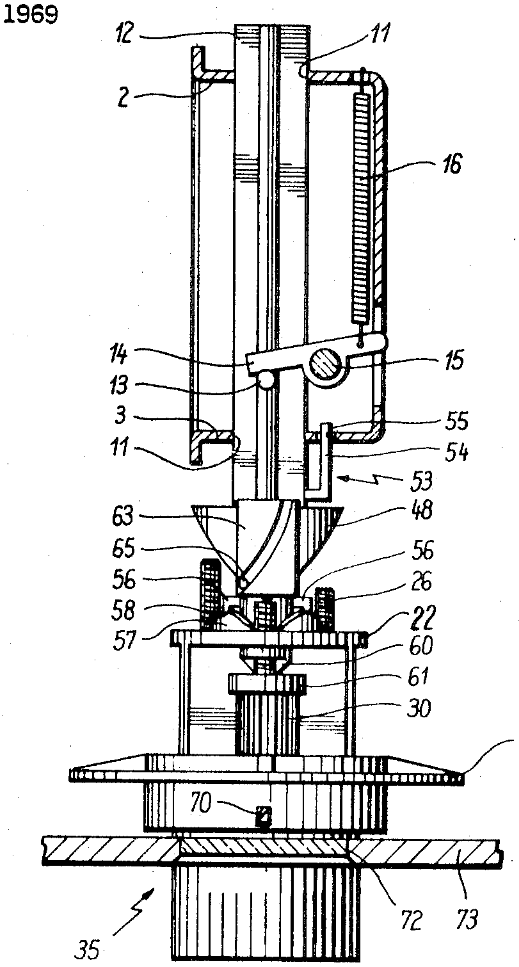

As shown in FIGS. 1 and 2, a shaft 5 extending in parallel relationship to a lateral wall 4 of a housing 1 and projecting from the front of said housing 1 is rotatably supported in two parallel longitudinal walls 2 and 3 in the immediate vicinity of said lateral wall 4 of said housing 1. Near the end facing the rear longitudinal wall 2 of the housing 1, the shaft 5 is provided with three locking grooves 6 distributed along the circumference and extending in the longitudinal direction of the shaft, said locking grooves 6 being engaged by a ball 8 supported in an opening 7 of the lateral wall 4 and loaded by a leaf spring 9 fastened to the lateral wall 4 on the outer side of said lateral wall 4, i.e. the side facing away from the shaft 5. At the end of the shaft 5 projecting from the front longitudinal wall 3 of the housing 1, a drum 10 is fastened with spaced relationship to said longitudinal wall.

Furthermore, a slide 12, projecting from the housing 1 at either end, is guided in slots 11 in the longitudinal walls 2 and 3 of said housing 1 on that side of the shaft 5 which faces away from the lateral wall 4 and in parallel relationship to the shaft 5. The portion of the slide 12 located within the housing 1 is provided with an inwardly directed lateral projection 13 on which rests the end of an arm 14 mounted on a tuning shaft 15. The tuning shaft 15 extends below, and transversely to, the shaft 5 and the slide 12 and, by means of ball bearings which are not illustrated in detail, is rotatably supported in the one lateral wall 4 at its one end and in the other lateral wall 4' of the housing 1 at its other end. A tension spring 16 is disposed between an extension of the arm 14 which projects beyond the tuning shaft 15 and the rear longitudinal wall 2. Along the portion facing away from the shaft 5 and the slide 12, the tuning shaft 15 carries three rotor plate assemblies 18 of variable capacitors 17, said rotor plate assemblies 18 being distributed along said portion of the tuning shaft and, depending on the position of the tuning shaft 15, meshing with three stator plate assemblies 19 fastened to the housing 1. Partitions 20 are disposed between the individual variable capacitors 17 and between the portion of the housing which accommodates the shaft 5 and the slide 12 on the one hand and the adjacent variable capacitor on the other hand, said partitions 20 extending in parallel relationship to the lateral walls 4 and 4'. The variable capacitors 17 are parts of tuned circuits which are not illustrated in detail.

Figure 3:
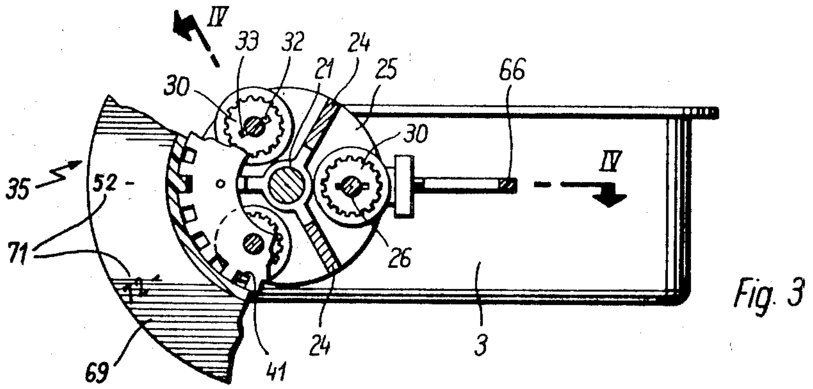
FIG. 3 is a section taken along the line III—III in FIG. 1.
Figure 4:
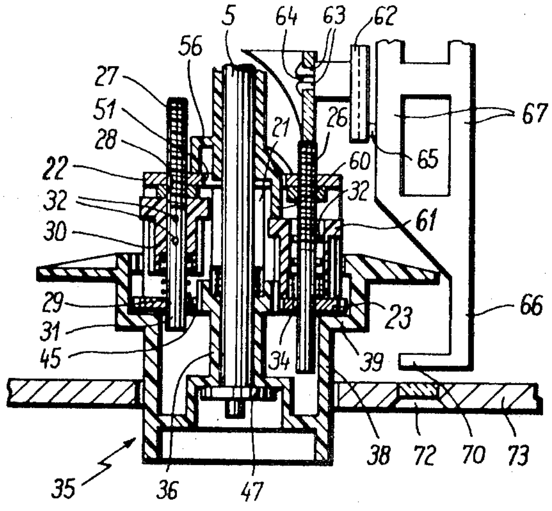
FIG. 4 is a section taken along the line IV—IV in FIG. 3 through the tuner according to FIG. 1.

The drum 10 is mounted on the shaft 5 in a manner preventing it from being rotated and slidably displaced separately from said shaft 5. As is best shown in FIGS. 3 and 4, the two ends of the drum 10 are provided with discs 22 and 23 connected by means of radial webs 24 which divide the drum 10 into three equal sectors 25. The webs 24 originate at a bushing 21 surrounding the shaft 5, said bushing 21 being located between the discs 22 and 23 and ending at either end at a certain distance from said discs which surround the shaft 5 at a distance. Within each sector 25 a set screw 26 is disposed which extends in the longitudinal direction of the drum 10. Each of the set screws 26 is provided with a screw thread 27 on one half of its length, said screw thread 27 engaging a threaded hole 28 in the disc of the drum 10 which faces the housing 1, i.e. the rear disc 22, while the other, plain half of each set screw is slidably guided in a hole 29 in the front disc 23 of the drum 10, i.e. the disc facing away from the housing 1. Gears 30 are supported on the set screws 26 in a manner permitting said gears 30 to be displaced while preventing them from being separately rotated. To this end, the plain portion 31 of each set screw 26 is penetrated by two pins 32 distributed over the length of said plain portion 31, both ends of said pins 32 projecting radially from the surface of said plain portion 31 of the set screws 26 and engaging longitudinal grooves 33 on the inner side of said gears 30. The lengths of the end portions of the set screws 26 projecting from the rear disc 22 may thus be changed by rotating the gears 30. The two pins 32 are located so that when the screw is turned in, i.e. flush with the rear disc 22, the pin facing the front disc 23 will come into contact with said front disc 23 and thus serve as a stop. Springs 34 which tend to force the gears 30 against the rear disc 22 at all times, are disposed between the one end of said gears 30 and the front disc 23.

A control knob 35 which is rotatable with respect to, and slidably displaceable in the longitudinal direction of, the shaft 5 is provided at the extreme end of the portion of said shaft 5 which projects from the front of the housing 1. The control knob 35 has a bushing 36 which surrounds the shaft 5 and, at its end facing the drum 10, is provided with a toothed wheel rim 37 along its circumference. The bushing 36 is surrounded by a pot-shaped part 38, the inside diameter of which is enlarged by means of a stepped portion 39 in the area of the toothed wheel rim 37, such that the end of said pot-shaped part 38 which faces the housing 1 encircles the front disc 23 of the drum 10. Along its circumference, the front disc 23 of the drum 10, which is secured to the webs 24 by means of screws which are not illustrated, is provided with teeth 41 which, in the rest position of the control knob, are engaged by four projections 42 disposed on the inside surface of the pot-shaped part 38. In the area of the toothed wheel rim 37, the bore of the bushing 36 features an enlargement 43 into which projects the one end of a helical compression spring 44 which is concentric with the shaft 5 and the other end of which, projecting through the hole 45 in the disc 23, bears against the bushing 21 of the drum 10. The spring 44 tends to force the control knob 35 into a position of rest away from the housing 1 in which position the bushing 36 bears against a spring washer 47 secured to the end of the shaft 5 which projects from the control knob 35. Since in this position of rest the projections 42 of the control knob 35 engage the teeth 41 of the disc 23 of the drum 10, the drum 10 mounted on the shaft 5 may be rotated by means of the control knob 35.

The end of the slide 12 which projects from the housing 1 in the direction of the drum 10 is provided with an essentially V-shaped cam piece 48 which is bent into a concentric configuration with respect to the shaft 5, such that it is located opposite the circle on which the set screws 26 are located, said circle being also concentric with the shaft 5. When the shaft 5 is positioned in a tuning lock, the peak 49 of the cam piece 48, owing to the action of the tension spring 16 connected to the slide 12, will contact the end of a set screw 26 projecting from the rear disc 22. When the drum 10 is rotated by means of the control knob 35, the end of the set screw 26 will slide along the cam piece 48 which will then be moved in the direction of the disc 22 of the drum 10 until either the peak 49 of the cam piece 48 contacts the disc 22 or until the end of the next set screw 26 projecting from the disc 22 engages the cam piece 48. When the next set screw 26 engages the cam piece 48, said cam piece 48 will be returned in the direction of the housing 1 against the force exerted by the tension spring 16 until the peak 49 of the cam piece 48 contacts the next set screw 26 when the shaft 5 has reached the next tuning lock. During this operation, the shaft 5 may be rotated either clockwise or anticlockwise.

Between the drum 10 and the housing 1, a sleeve 50 is slidably supported on the shaft 5. At one end, the sleeve 50 projects through a hole 51 in the rear disc 22, said hole 51 being concentric with the shaft 5, and bears against the bushing 21 of the drum 10. The end of the sleeve 50 which faces away from the drum 10 bears against a spring 52 surrounding the shaft 5, said spring 52 being supported on the housing 1 and tending to force the sleeve 50 against the drum 10. At its end facing the housing 1 the sleeve 50 is provided with an angular piece 53 with a leg 54 extending in parallel relationship to the shaft 5 and being guided in an opening 55 of the front longitudinal wall 3 of the housing 1. The sleeve 50 is thus disposed on the shaft 5 in a manner permitting it to be slidably displaced, but not rotated with respect to said shaft 5. The end portion of the sleeve 50 facing the drum 10 is provided with two integral lugs 56 which cooperate with axially directed control cams 57 disposed at the edge of the hole 51 in the front disc 22 of the drum 10. The development of said axailly directed control cams 57 shows a V-shaped pattern with an outwardly directed peak 58 over the length of one arc each, which equals the distance between adjacent set screws 26, the control cams 57 being disposed along the periphery of a circle with a diameter smaller than that of the circle along the periphery of which are located the set screws 26. The peaks 58 are disposed between two set screws 26 each, such that the valleys 59 of the control cam 57 and the set screws are located on a common radius of the drum. The valleys 59 extend down to the surface of the disc 22 located opposite the housing 1. In addition, the end of the sleeve 50 projecting into the drum 10 is provided with an integral stop 60 which bottoms against the end facing the disc 22 of that gear 30 which is located on that of the set screws 26 which is in the operative position, i.e. engaging the peak 49 of the cam piece 48. At the end facing the housing 1 each gear 30 has a collar 61 which serves as a seat for the stop 60. The lugs 56 and the stop 60 forming integral parts of the sleeve 50 are so disposed along the circumference of the sleeve 50 as to include an angle of 120 degrees, the stop 60 being located in the same plane as the peak 49 of the cam piece 48 of the slide 12.

If, as shown in FIG. 4, the control knob 35 is displaced on the shaft 5 in the direction of the housing 1 until the stepped portion 39 of the control knob 35 contacts the front disc 23 of the drum, the projections 42 of the pot-shaped part 38 of the control knob 35 are disengaged from the teeth 41 of the front disc 23. Simultaneously, the toothed wheel rim 37 of the bushing 36 penetrates through the hole 29 in the front disc 23. With the shaft 5 positioned in a tuning lock, the lugs 56 of the sleeve 50, which is slidably supported on the shaft, are located in the valleys 59 of the control cam 57 disposed at the rear disc 22 of the drum and the gear 30 of that set screw 26 which is in the operative position is forced in the direction of the front disc 23 by the stop 60 of the sleeve 50 against the force exerted by the spring 34 loading that particular gear. In this position, that particular gear and the toothed wheel rim 37 of the control knob 35 are brought into mesh. The length of the end projecting from the rear disc 22 of the drum 10 of the set screw 26 which is in the operative position may now be changed by rotating the control knob 35, such that the slide 12 will be displaced longitudinally, with the result that the rotors 18 of the variable capacitors 17 will be rotated and enter between the plates of the stator plate assemblies 19 to a greater or lesser degree. The part of each set screw 26 which projects from the front disc 23 is encircled by the control knob 35. When the ocntrol knob 35 is released to return it to its position of rest, it will again form a positive connection with the drum 10 so that the drum may again be rotated. During this rotation, the lugs 56 of the sleeve 50 slide along the control cam 57 of the drum 10 and the sleeve 50 is displaced in the direction of the housing 1 against the force exerted by the spring 52 so that the stop 60 is also moved in the direction of the housing 1, whereupon the gear 30 of the corresponding set screw 26 will also move in the direction of the rear disc 22 under the force exerted by the spring 34. Upon further rotation of the shaft 5, the sleeve 50 will again be moved in the direction of the drum 10 and the stop 60 will engage the collar 61 of the next gear 30, displacing said gear against the force exerted by the spring 34 in the direction of the front disc 23 so that now this gear 30 will be located in the area where it can be brought into mesh with the toothed wheel rim 37 of the control knob 35. The positive connection between the gear 30 and the toothed wheel rim of the control knob 35 will be formed only, if both of two conditions are fulfilled: the gear 30 must have been pushed in the direction of the disc 23 and the control knob 35 must have been displaced in the direction of the housing 1.

As is also apparent from the accompanying drawing, a slotted-link-type guide 62 is disposed outside the housing 1 on the lateral surface of the cam piece 48 facing away from the shaft 5. The slotted-link-type guide is inserted in a recess 64 of the cam piece 48 by means of flexible tongues 63. The slotted link of the slotted-link-type guide 62 forms an angle with the direction in which the slide 12 moves and is engaged by a pin 65 forming an integral part of an arm 66 which serves as a pointer for a scale. The arm 66 is a plastic component and has two webs 67 located in parallel relationship to each other in a common plane with the pin 65, said webs 67 being permanently secured to the front longitudinal wall 3 of the housing 1 at one end and featuring areas of reduced strength 68, which serve as a swivel joint, at a distance from the longitudinal wall 3. The swivel axis defined by said areas of reduced strength extends in parallel relationship to said pin 65. The length of the arm 66 is such that the arm projects beyond a disc 69 disposed at the end of the pot-shaped part 38 of the control knob 35 which faces the housing 1. At its end, the arm 66 is provided with a pointer 70, bent-off at an angle and extending in parallel relationship with the disc 69 in the direction of the shaft 5. The surface of the disc 69 facing the pointer 70 is provided with a scale 71 disposed along its circumference. When the tuner according to the present invention is installed in a housing 73, e.g. the housing of a television set, the scale disposed on the disc 69 and the pointer 70 sweeping over the scale 71 are visible through a window 72 in the housing 73.

Although a specific embodiment of the invention has been described in detail, it shall be understood that numerous modifications of the embodiment shown by way of example are possible without leaving the scope of invention as defined by the claims. In particular, it shall be understood that the tuner according to the present invention is not restricted to three-channel selector types, but may also take the form of a four-channel selector, for example. Furthermore, the tuning elements may be of the inductive rather than the capacitive type or else may be formed by potentiometers for triggering voltage-variable capacitors.

Having thus fully described our invention, what we claim as new and wish to secure by Letters Patent is:

1. A tuner and, more particularly, a tuner for television sets with drive means comprising a housing, a drum rotatably supported about its longitudinal center line with set screws extending in parallel relationship with said longitudinal center line of the drum and being evenly spaced in an angular direction about said center line of said drum and a scanning member which is coupled with tuning elements of said tuner and includes a V-shaped cam piece which is located within the path of said set screws and the peak of which is arranged to contact the ends of the set screws, characterized in that said drum is mounted on an axle or shaft carried by the housing of the tuner and in that the scanning member takes the form of a slide which is supported in said housing of the tuner and is engageably coupled to the tuning elements of the tuner.

2. A tuner according to claim 1, characterized in that the slide, on a portion located within the housing, is provided with a lateral projection, on which rests an arm mounted on a tuning shaft on which a portion of said tuning elements are mounted disposed transversely to said slide, said arm being loaded by a spring which forces said arm against said projection and said slide with its cam piece against the set screw which is in the operative position.

3. A tuner according to claim 1, characterized in that the drum is fastened on said shaft and in that a control knob, which may be alternatively operably coupled with the drum or the set screw is rotatably supported on said shaft.

4. A tuner according to claim 3, characterized in that the control knob is supported in a manner permitting it to be slidably dispaced in the longitudinal direction of the shaft and in that said control knob, in one position, forms a positive connection with the dum and, in the other position, forms a positive connection with the transmission connected to the set screw.

5. A tuner according to claim 4, characterized in that the contol knob is hollow and surrounds the drum on at least part of its length and in that said drum, along its circumference, is provided with teeth, said teeth being engaged by a projection of the control knob when said control knob is in the one position.

6. A tuner according to claim 4, characterized in that the control knob is provided with a toothed wheel rim disposed concentrically with the shaft, said toothed wheel rim engaging said transmission, said transmission comprising a gear disposed on the set screw which is in the operative position, when said control knob is in the other position.

7. A tuner according to claim 6, characterized in that the toothed wheel rim is disposed on the circumference of the end of a bushing of the control knob projecting into the drum.

8. A tuner according to claim 4 characterized in that the control knob is loaded by a helical compression spring disposed concentrically with the shaft, said spring tending to keep said control knob in the one position, in which it forms a positive connection with the drum.

9. A tuner according to claim 6, characterized in that one gear is supported on each of the set screws in a manner permitting said gear to be slidably displaced, while preventing it from being separately rotated, in that said gear is loaded by a spring which tends to keep said gear in a position in which it is located outside the area in which it may be brought into mesh with the toothed wheel rim connected to the control knob, and in that a stop is disposed within the area corresponding to the operative position of the set screws, said stop being contacted by the end face of the gear of the set screw and forcing said gear into the area in which it may be brought into mesh with the toothed wheel rim.

10. A tuner according to claim 9, characterized in that the stop is disposed on a sleeve, said sleeve being rotatably supported on shaft, non-rotatably guided in the housing, and projecting into the end face of the drum facing the housing.

11. A tuner according to claim 10, characterized in that the sleeve carrying the stop is slidably supported on the shaft and forced in the direction of the drum by a spring and in that axially directed control cams cooperating with lugs on the sleeve are disposed on the end face of the drum, said control cams axially displacing the sleeve, when the drum is rotated, within the range defined by the respective operative positions until the stop is moved out of reach of the gears.

12. A tuner according to claim 11, characterized in that the development of the axially directed control cams over the length of one arc each, equalling the distance between adjacent set screws, shows a V-shaped pattern with an outwardly directed peak.

13. A tuner according to claim 1 provided with a scale, characterized in that the scale pointer is disposed on an arm extending in essentially parallel relationship with the slide and being swivable about an axis directed perpendicularly to said slide, said arms being drivingly connected to said slide, in the area between said axis and the end of said arm which carries said pointer, through a slotted-link-type guide with a slotted link disposed diagonally to the direction in which said slide moves.

14. A tuner according to claim 13, characterized in that the slotted-link-type guide is disposed on a lateral surface of the cam pieces and in that the arm is provided with a laterally projecting pin which engages the slotted guide.

15. A tuner according to claim 13, characterized in that the arm, which is made of plastic, is permanently fastened to the housing and provided with a point of reduced strength in the area of the axis, said point of reduced strength serving as a swivel joint.

16. A tuner according to claim 1, characterized in that, at a point located within the housing, the shaft carrying the drum is provided with axially directed locking grooves distributed along the circumference of said shaft, each of said locking grooves corresponding to one operative position of said drum, said locking grooves being engaged by a spring-loaded locking member disposed on the housing.

17. A tuner according to claim 16, characterized in that the shaft is located near a wall of the housing and in that the locking member takes the form of a ball supported in an opening of said wall of the housing, said ball being loaded by a leaf spring on the side of said wall facing away from said shaft.

References Cited

UNITED STATES PATENTS

| | | | |
|---|---|---|---|
| 3,415,127 | 12/1968 | Miner et al. | 74—10.6 |
| 3,459,055 | 8/1969 | Sperber | 74—10.6 |

MILTON KAUFMAN, Primary Examiner